United States Patent
Reed

(10) Patent No.: US 11,940,921 B2
(45) Date of Patent: Mar. 26, 2024

(54) BOUNDING BOX PREFETCHER

(71) Applicant: CENTAUR TECHNOLOGY, INC., Austin, TX (US)

(72) Inventor: Douglas Raye Reed, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 7 days.

(21) Appl. No.: 17/570,452

(22) Filed: Jan. 7, 2022

(65) Prior Publication Data

US 2023/0222064 A1 Jul. 13, 2023

(51) Int. Cl.
*G06F 12/08* (2016.01)
*G06F 12/0811* (2016.01)
*G06F 12/0862* (2016.01)

(52) U.S. Cl.
CPC ...... *G06F 12/0862* (2013.01); *G06F 12/0811* (2013.01); *G06F 2212/602* (2013.01)

(58) Field of Classification Search
CPC ............. G06F 12/0862; G06F 12/0811; G06F 2212/602

USPC ........................................................ 711/122
See application file for complete search history.

(56) References Cited

U.S. PATENT DOCUMENTS

| | | | |
|---|---|---|---|
| 8,880,807 B2* | 11/2014 | Hooker | G06F 9/3814 711/137 |
| 2016/0041914 A1* | 2/2016 | Eckert | G06F 12/0862 711/139 |
| 2016/0070651 A1* | 3/2016 | Shwartsman | G06F 12/0862 711/122 |
| 2020/0301840 A1* | 9/2020 | Reed | G06F 12/0864 |

FOREIGN PATENT DOCUMENTS

CN 113760783 A 12/2021

\* cited by examiner

*Primary Examiner* — Hua J Song
(74) *Attorney, Agent, or Firm* — McClure, Qualey & Rodack, LLP

(57) ABSTRACT

In one embodiment, a prefetching method implemented in a microprocessor, the prefetching method comprising: issuing all prefetches remaining for a memory block as L3 prefetches based on a set of conditions; and issuing L2 prefetches for cache lines corresponding to the L3 prefetches upon reaching the end of the memory block.

20 Claims, 7 Drawing Sheets

BOUNDING BOX PREFETCHER

TECHNICAL FIELD

The present invention relates in general to microprocessors, and in particular, prefetching in microprocessors.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus comprises a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor inefficiently waits idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

Cache prefetching via a prefetch unit (also referred to as a prefetcher) is a technique used by microprocessors to further boost execution performance by fetching instructions or data from external memory into a cache memory, before the data or instructions are actually needed by the processor. Successfully prefetching data avoids the latency that is encountered when having to retrieve data from external memory.

There is a basic tradeoff in prefetching. As noted above, prefetching can improve performance by reducing latency (by already fetching the data into the cache memory, before it is actually needed). On the other hand, if too much information (e.g., too many cache lines) is prefetched, then the efficiency of the prefetch unit is reduced, and other system resources and bandwidth may be overtaxed. Furthermore, if a cache is full, then prefetching a new cache line into that cache will result in eviction from the cache of another cache line. Thus, a line in the cache that was in the cache because it was previously needed might be evicted by a line that only might be needed in the future.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger and has more storage resources than the L1 cache. Some microprocessors may have a third cache (L3), which may be larger than the L2 cache.

Fetch times increase as fetches go from L1, L2, L3 caches, and system memory based on a cache miss (e.g., 10-20 clock cycles from L2, 20-30 clock cycles from L3 for illustration), and so it is desirable from a latency standpoint to not only intelligently store data in the appropriate cache, but to intelligently prefetch data.

SUMMARY

In one embodiment, a prefetching method implemented in a microprocessor, the prefetching method comprising: issuing all prefetches remaining for a memory block as L3 prefetches based on a set of conditions; and issuing L2 prefetches for cache lines corresponding to the L3 prefetches upon reaching the end of the memory block.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1:
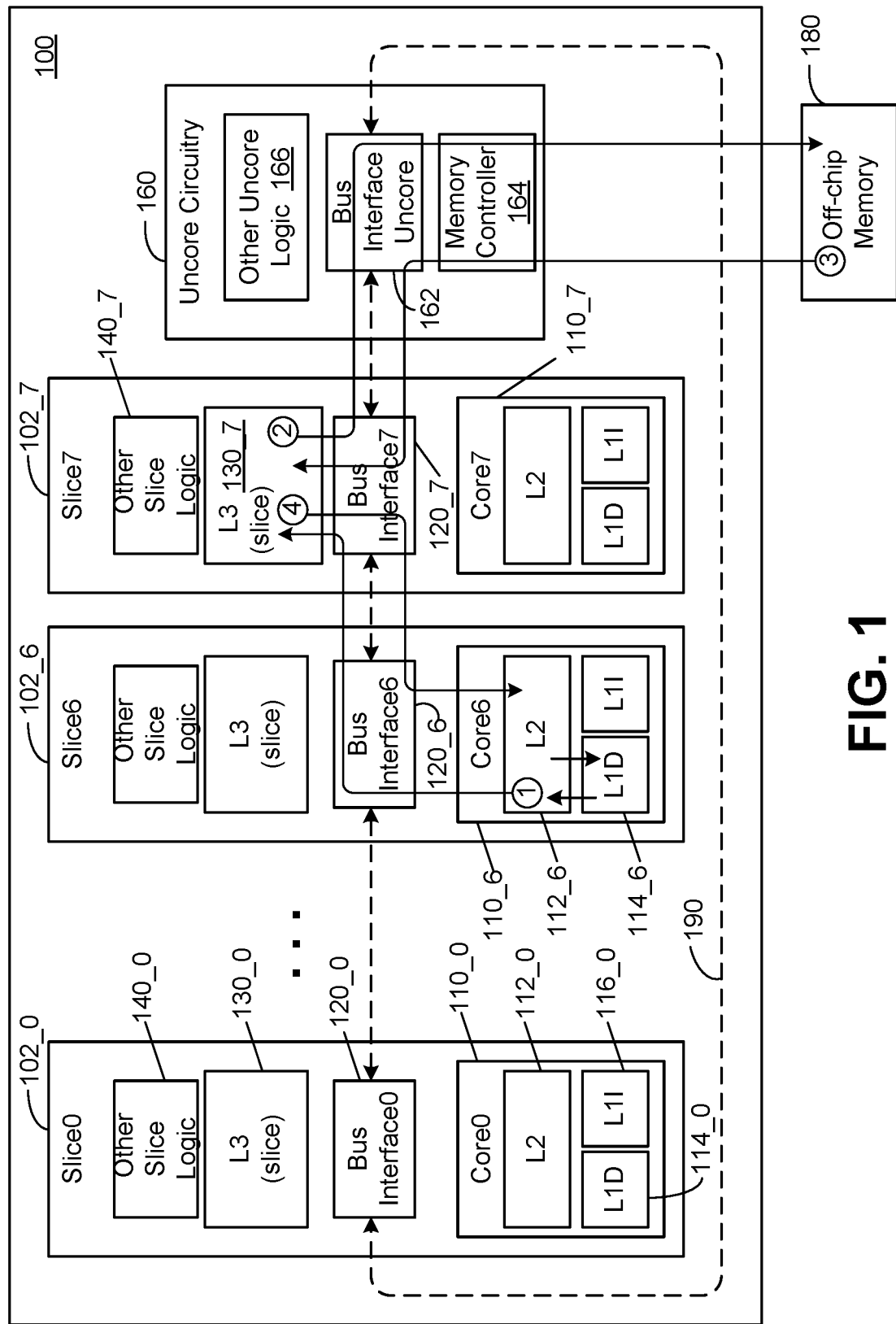
FIG. 1 is a block diagram showing an example microprocessor in which an embodiment of a bounding box prefetch unit is implemented.

Certain embodiments of a bounding box prefetch unit of a microprocessor and associated methods are disclosed that intelligently manage prefetching among a hierarchy of caches under aggressive prefetching conditions to ensure suitable fill queue bandwidth to efficiently handle prefetches and load/store demand requests. In one embodiment, the bounding box prefetch unit resides in a second-level (L2) cache, and the hierarchy of caches includes a first-level (L1) cache, the L2 cache, and a third-level (L3) cache. In applications where accesses are very dense, even if aperiodic, the detection of patterns (of accesses) to enable intelligent prefetching is challenging. For instance, a dense access pattern includes accesses exhibiting a high spatial locality, where a majority of cache lines being accessed are near other cache lines being accessed. Accordingly, certain embodiments of a bounding box prefetch unit may suspend pattern matching in lieu of more aggressive prefetching amongst one or more memory blocks. As is known, a memory block corresponds to physical memory (e.g., system memory, such as DRAM), though in some embodiments may correspond to virtual memory. A memory block may correspond to a virtual page or virtual pages, and hence references to a memory block access hereinafter may also include references to the corresponding page access. The bounding box prefetch unit maintains plural prefetcher page entries (sometimes referred to as stream entries or state entries).

Continuing, under aggressive prefetching, the L2 cache may generate far more prefetches than any reasonably sized L2 fill queue (also known in the industry as a fill buffer or miss status holding register, which allocates an entry for each L2 cache miss) is able to handle. In one embodiment, in view of the L2 fill queue attaining (e.g., including exceeding) a given capacity threshold, the L2 prefetches are effectively converted to L3 prefetches (also referred to as last level cache, or LLC, prefetches), where aggressive prefetching of cache lines bringing in cache lines from system memory to the L3 cache is implemented, and all cache lines brought into the L3 cache (e.g., from system memory) are recorded via an access (also, block) bitmask. The L3 prefetches are based in part on a special attribute (e.g., bit setting) in the prefetch request in the L2 cache, as described below. When the bounding box prefetch unit has finished bringing all cache lines (e.g., for a memory block) into the L3 cache (e.g., upon the end of the memory block being reached), the bounding box prefetch unit issues L2 prefetches (e.g., to sequentially bring those cache lines from the L3 cache into the L2 cache). In one embodiment, the bounding box prefetch issues the L2 prefetches (e.g., based in part on a bit setting in the prefetch request in the L2 cache, as describe below), and returns to a location of the memory block pointed to by a min or max pointer (depending on the determined trending direction of accesses) to begin the L2 prefetches for the previous L3 prefetched cache lines initially intended for the L2 cache but due to an L2 fill queue constraint brought into the L3 cache. If a cache line was not among the previous L3 prefetches, or if the cache line has subsequently been requested via a L1 cache access, the prefetch is skipped. Through this method of operation, the prefetches brought into the L3 cache are very aggressive under dense access conditions, which brings in as many cache lines into the cache hierarchy as possible to prevent costly demand accesses to system memory (e.g., DRAM), while also utilizing the remaining L2 fill queue bandwidth after the L3 prefetches have completed to turn what would otherwise be L3 demand request hits into L2 demand request hits.

Note that reference herein to an L3 prefetch generally refers to an L2 cache-generated prefetch of a cache line or cache lines brought into the L3 cache (e.g., from system memory), and an L2 prefetch generally refers to an L2 cache-generated prefetch of a cache line or cache lines brought into the L2 cache (e.g., from the L3 cache or system memory).

Having summarized certain features of a bounding box prefetch unit of the present invention, reference will now be made in detail to the description of a bounding box prefetch unit as illustrated in the drawings. While a bounding box prefetch unit will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" (and similarly with "comprise", "comprising", and "comprises") mean including (comprising), but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons of ordinary skill in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (e.g., VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g., Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1 is a block diagram showing an example microprocessor in which an embodiment of a bounding box prefetch unit is implemented. As will be described herein, the present invention is directed to an improved mechanism for prefetching data into a cache memory under conditions including aggressive prefetching where accesses are dense (e.g., exhibiting high spatial locality) yet pattern matching is difficult to predict and L2 fill queue constraints are present. Before describing this prefetching mechanism, however, one example architecture is described, in which the inventive bounding box prefetch unit may be utilized. In this regard, reference is now made to FIG. 1, which is a diagram illustrating a multi-core microprocessor 100. As will be appreciated by persons having ordinary skill in the art from the description provided herein, the present invention may be implemented in a variety of circuit configurations and architectures, and the architecture illustrated in FIG. 1 is merely one of many suitable architectures. Specifically, in the embodiment illustrated in FIG. 1, the microprocessor 100 is an eight-core processor, wherein the cores are enumerated core0 110_0 through core7 110_7.

In the illustrated embodiment, numerous circuit components and details are omitted, which are not germane to an understanding of the present invention. As will be appreciated by persons having ordinary skill in the art, each processing core (110_0 through 110_7) includes certain associated or companion circuitry that is replicated throughout the microprocessor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level-one (L1) cache, a level-two (L2) cache, and a level-three (L3) cache. The L1 cache is separated into both a data cache and an instruction cache, respectively denoted as L1D and L1I. The L2 cache also resides on core, meaning that both the L1 cache and the L2 cache are in the same circuitry as the core of each slice. That is, each core of each slice has its own dedicated L1D, L1I, and L2 caches. Outside of the core, but within each slice is an L3 cache. In one embodiment, the L3 cache 130_0 through 130_7 (also collectively referred to herein as 130) is a distributed cache, meaning that, in this example eight-core architecture, ⅛th of the L3 cache resides in slice0 102_0, ⅛th of the L3 cache resides in slice1 102_1, etc. In one embodiment, each L1 cache is 32 k in size, each L2 cache is 256 k in size, and each slice of the L3 cache is 2 megabytes in size. Thus, the total size of the L3 cache is 16 megabytes. Note that other individual or aggregate cache sizes may be used in some embodiments.

Bus interface logic 120_0 through 120_7 is provided in each slice in order to manage communications from the various circuit components among the different slices. As illustrated in FIG. 1, a communication bus is 190 is utilized to allow communications among the various circuit slices, as well as with uncore circuitry 160. The uncore circuitry 160 merely denotes additional circuitry that is on the processor chip, but is not part of the core circuitry associated with each slice. As with each illustrated slice, the un-core circuitry 160 includes a bus interface circuit 162. Also illustrated is a memory controller 164 for interfacing with off-processor (off-chip) memory 180. Finally, other un-core logic 166 is broadly denoted by a block, which represents other circuitry that may be included as a part of the un-core processor circuitry (and again, which need not be described for an understanding of the invention).

To better illustrate certain inter and intra communications of some of the circuit components, the following example will be presented. This example illustrates communications associated with a hypothetical load miss in the core6 cache. That is, this hypothetical assumes that the processing core6 110_6 is executing code that requests a load for data at hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three-bit address (sufficient to identify which slice—slice 0 through slice 7—the data is stored in).

In keeping with the example, assume this hashing function results in an indication that the data, if present in the L3 cache, would be present in that portion of the L3 cache residing in slice7. A communication is then made from the L2 cache of slice6 102_6 through bus interfaces 120_6 and 120_7 to the L3 cache present in slice7 102_7. This communication is denoted in the figure by the encircled number 1. If the data was present in the L3 cache, then it would be communicated back from the L3 cache 130_7 to the L2 cache 112_6. However, and in this example, assume that the data is not in the L3 cache either, resulting in a cache miss. Consequently, a communication is made from the L3 cache 130_7 through bus interface7 120_7 through the un-core bus interface 162 to the off-chip memory 180, through the memory controller 164. This communication is denoted in the figure by the encircled number 2. A cache line that includes the data residing at address 1000 is then communicated from the off-chip memory 180 back through memory controller 164 and un-core bus interface 162 into the L3 cache 130_7. This communication is denoted in the figure by the encircled number 3. After that data is written into the L3 cache, it is then communicated to the requesting core, core6 110_6 through the bus interfaces 120_7 and 120_6. This communication is denoted in the figure by the encircled number 4.

At this point, once the load request has been completed, in one embodiment, that data will reside in each of the caches L3, L2, and L1D. The present invention is directed to an improved bounding box prefetch unit that resides in each of the L2 caches 112_0 through 112_7. In the illustrated embodiment, as mentioned above, the L1 cache is a relatively small sized cache. Consequently, there can be performance and bandwidth consequences for prefetching too aggressively into the L1 cache. In this regard, a more complex or aggressive prefetcher generally consumes more silicon real estate in the chip, as well as more power and other resources. Also, from the example described above, excessive prefetching into the L1 cache may often result in more misses and evictions; this consumes additional circuit resources, as well as bandwidth resources for the communications necessary for prefetching the data into the respective L1 cache. More specifically, since the illustrated embodiment shares an on-chip communication bus denoted by the dashed line 190, excessive communications consume additional bandwidth, potentially unnecessarily delaying other communications or resources that are needed by other portions of the microprocessor 100.

In one embodiment, the L1I and L1D caches are both smaller than the L2 cache and need to be able to satisfy data requests much faster. Therefore, the prefetcher that is implemented in the L1I and L1D caches of each slice is preferably a relatively simple prefetcher. As well, the L1D cache needs to be able to pipeline requests. Therefore, putting additional prefetching circuitry in the L1D can be relatively taxing. Further still, a complicated prefetcher would likely get in the way of other necessary circuitry. With regard to a cache line of each of the L1 caches, in one embodiment the cache line is 64 bytes. Thus, 64 bytes of load data can be loaded per clock cycle.

As mentioned above, in one embodiment, the L2 cache is preferably 256 KB in size. Having a larger area than prefetch units implemented in the L1 cache, the bounding box prefetch unit implemented in the L2 cache can be more complex and aggressive. Generally, implementing a more complicated prefetcher in the L2 cache results in less of a performance penalty (e.g., as compared to an L1 prefetcher) for bringing in data speculatively. Therefore, the bounding box prefetch unit of the present invention is implemented in the L2 cache.

Figure 2:
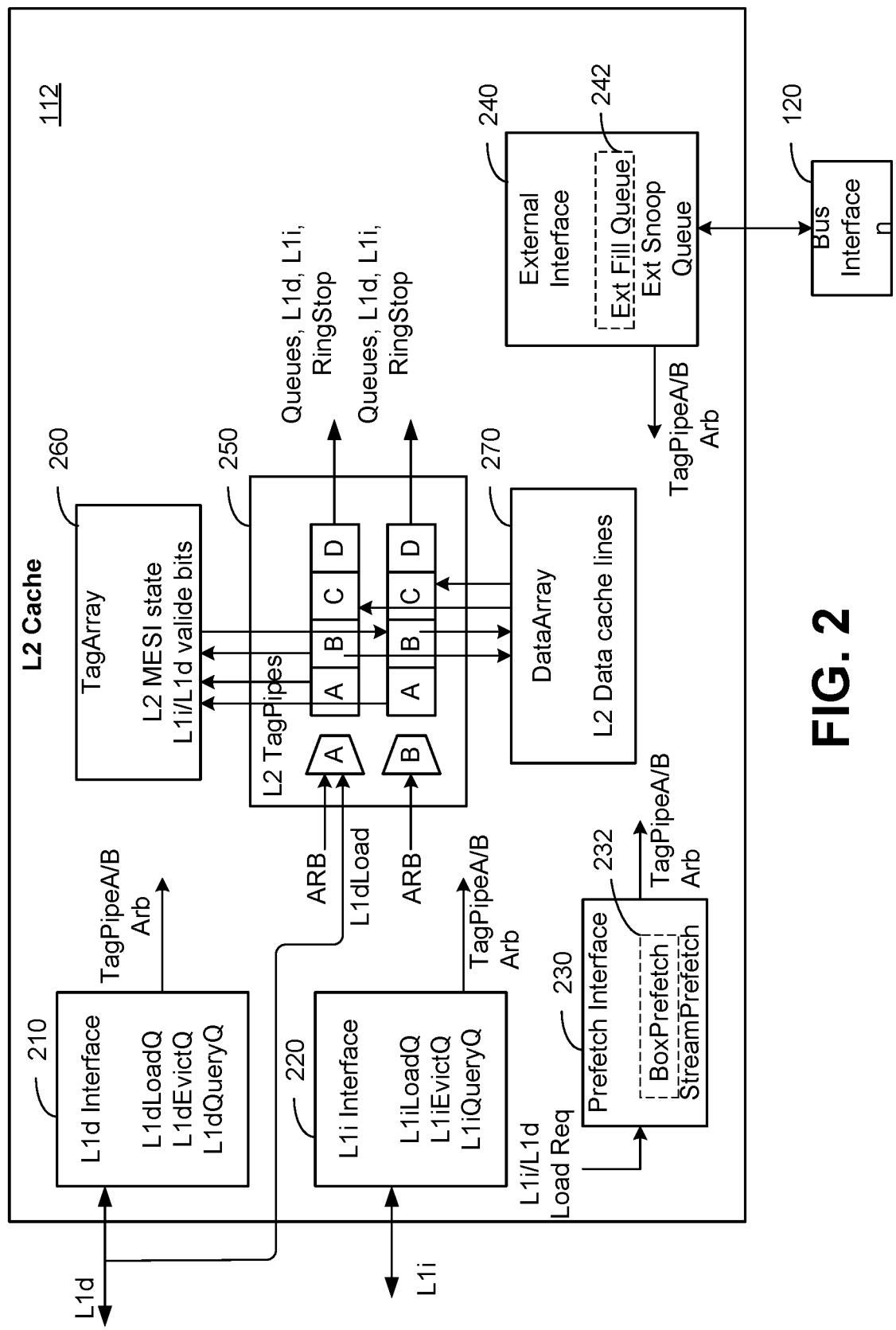
FIG. 2 is a block diagram showing an example L2 cache in which an embodiment of a bounding box prefetch unit is implemented.

Before describing details of the inventive bounding box prefetch unit, reference is first made to FIG. 2, which is a block diagram showing an example L2 cache 112 in which an embodiment of a bounding box prefetch unit 232 is implemented. Specifically, the components illustrated in FIG. 2 depict the bounding box prefetch unit 232 and other basic features of a structure that facilitate the communications within the L2 cache 112 and with other components in the system illustrated in FIG. 1. As shown, there are four main boxes 210, 220, 230, and 240, which illustrate an L1D interface 210, an L1I interface 220, a prefetch interface 230, and an external interface 240. Collectively, these boxes denote circuitry that queue and track transactions or requests through the L2 cache 112. As illustrated in FIG. 1, in each core, there is both an L1D and L1I cache, and a higher level L2 cache. The L1D interface 210 and L1I interface 220 interface the L2 cache with the L1 caches. These interfaces implement a load queue, an evict queue and a query queue, for example, as mechanisms to facilitate this communication. The prefetch interface 230 is circuitry that facilitates communications associated with the bounding box prefetch unit 232 of the present invention, which will be described in more detail below. In one embodiment, the prefetch interface 230 implements both a bounding box prefetch unit 232 and a stream prefetcher, and may make prefetch determination based on results of their associated algorithms. As is known, the design of prefetchers often involve a tradeoff between how quickly the prefetcher can warm up (e.g., how much state is required to be built up before generating prefetches) and how aggressively the prefetcher makes requests. As an illustration, a bounding box prefetcher may take a relatively long time to warm up (e.g., 5-8 requests) before a pattern is established, yet once a pattern is established, there is relatively good confidence that the pattern is a good pattern upon which the prefetching is based, and thus prefetches may be performed relatively aggressively. On the other hand, stream prefetchers are much less sophisticated, whereby it may take only 3 accesses to warm up (e.g., build up state) before prefetches are generated. In effect, stream prefetchers essentially look for a repeated stride between sequential accesses, and generate prefetches according to that stride. Further, stream prefetchers may perform next-line prefetching in cases where a new request comes in to a new page that is not currently being tracked. Collectively, such features enable stream prefetchers to begin prefetching very early on once commencing a new page, though the prefetches are of lower confidence and thus are issued less aggressively. There are numerous, known stream prefetching algorithms that may be used for the stream prefetch unit, the discussion of which is omitted here as unnecessary for describing the bounding box prefetch unit, which is the subject of the present disclosure. A general structure and operation of bounding box prefetchers is described in U.S. Pat. No. 8,880,807, which is incorporated herein by reference in its entirety, and for which a general description of select features of the bounding box prefetcher is described below.

As will be appreciated by those having ordinary skill in the art, the prefetching algorithms used by the bounding box prefetch unit 232 (and the stream prefetching unit) are performed in part by monitoring load requests from L1I and L1D caches associated with a given core. Accordingly, these are illustrated as inputs to the prefetch interface 230. The output of the prefetch interface 230 is in the form of an arbitration request of tagpipe 250, whose relevant function, which is briefly described herein, will be appreciated by persons having ordinary skill in the art. Finally, the external interface 240 provides the interface to components outside the L2 cache and indeed outside the processor core, and includes an L2 fill queue 242, as explained below, and an external snoop queue. As described in connection with FIG. 1, such communications, particularly off-slice communications, are routed through the bus interface 120.

As illustrated in FIG. 2, each of the circuit blocks 210, 220, 230, and 240, have outputs that are denoted as tagpipe arbitration (arb) requests. Tagpipes 250 are provided as a central point through which almost all L2 cache traffic travels. In the illustrated embodiment, there are two tagpipes denoted as A and B. Two such tagpipes are provided merely for load balancing, and as such the tagpipe requests that are output from circuits 210, 220, 230, and 240, the various interface circuits, can be directed to either tagpipe A or tagpipe B, again based on load balancing. In one embodiment, the tagpipes are four stage pipes, with the stages denoted by letters A, B, C, and D, though in some embodiments, other quantities of stages may be used. Transactions to access the cache, sometimes referred to herein as "tagpipe arbs," advance through the stages of the tagpipe 250. During the A stage, a transaction requests into the tagpipe. This transaction has two attributes corresponding to L2 and L3 prefetches: ForcePrefetchL2 and ForcePrefetchL3.

During the B stage, the tag is sent to the arrays (tag array 260 and data array 270). Further, in the B stage, a comparison is performed of the number of valid fill queue entries to a threshold. If the number of valid fill queue entries exceeds the threshold and ForcePrefetchL2 is not set, the prefetch request is turned into an L3 prefetch. If either of the ForcePrefetchL2 or ForcePrefetchL3 bits are set, the prefetch ignores the threshold calculation and continues as either a L2 or L3 prefetch (respectively). The ForcePrefetchL2/L3 bits are mutually exclusive. During the C stage, MESI information and an indication of whether the tag hit or miss in the LLC is received from the arrays and a determination is made on what action to take in view of the information received from the array. During the D stage, the action decision (complete/replay, allocate a fill queue entry, etc.) is staged back to the requesting queues.

The external interface 240 comprises the external fill queue 242 (or simply referred to herein also as fill queue or L2 fill queue), and an external snoop queue. As will be described further below, any time there is a miss in the L2 cache, an entry is allocated to the fill queue 242. The fill queue limits the total number of outstanding L2 to L3 misses. The fill queue 242 comprises a collection of state registers that track such information as physical addresses, a memory tree, certain features of the opcode (e.g., whether it is read, validate, a cache line flush, a regular load request, I/O request, whether it is destined for an accelerator, etc.). Also, the fill queue 242 includes control logic (e.g., a finite state machine per entry), which tracks information including whether there is a cache line to evict, among other functions as should be appreciated by one having ordinary skill in the art.

Finally, FIG. 2 illustrates a tag array 260 and data array 270. The tag array 260 effectively or essentially includes metadata while the data array 270 is the memory space that includes the actual cache lines of data. The metadata in the tag array 260 includes MESI state as well as the L1I and L1D valid bits. As is known, the MESI state defines whether the data stored in the data array 270 are in one of the modified ("M"), exclusive ("E"), shared ("S"), or invalid ("I") states.

Figure 3A:
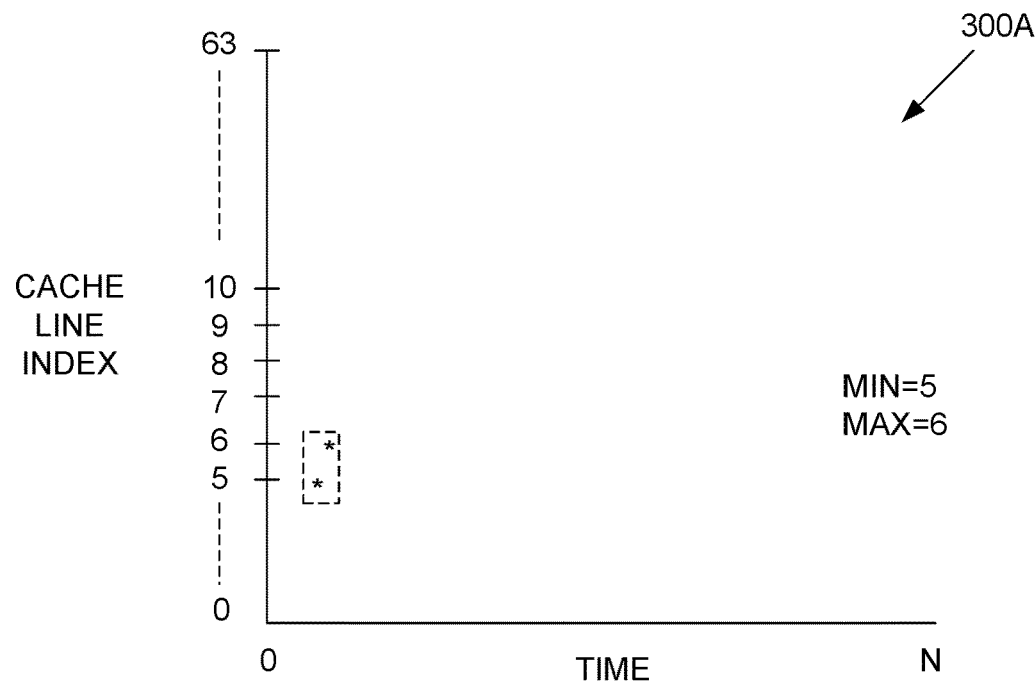
FIGS. 3A-3B are plot diagrams that illustrate bounding box prefetching.
Figure 3B:
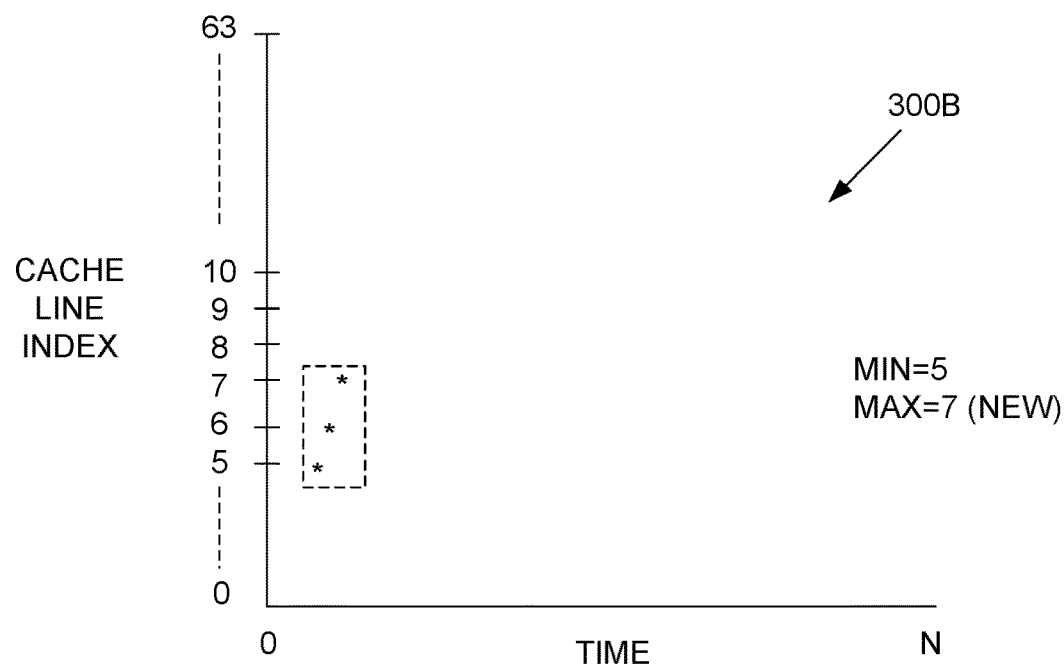

Having described an example environment in which certain embodiments of a bounding box prefetch unit may be implemented, attention is directed to FIGS. 3A-3B, which are plot diagrams that generally illustrate bounding box prefetching. Broadly speaking, bounding box prefetching may be explained as follows. If all accesses to a memory block were represented on a graph, the set of all accesses may be enclosed by a bounding box (e.g., schematically illustrated with a dashed box in FIGS. 3A-3B). If additional requests were represented on the same graph, those requests may also be enclosed by adjusting the size of the bounding box. In the first graph 300A shown in FIG. 3A, two accesses to a memory block are represented. The x-axis reflects a temporal order of the accesses. The y-axis represents a 64-byte cache line index within a 4 kilobyte (KB) block of the access. Initially, the first two accesses are graphed: the first is to cache line 5, the second is to cache line 6. A box is drawn which encloses these two points, and pointers indicating minimum (e.g., min=5) and maximum (e.g., max=6) access locations are shown on the right-hand side of the diagram 300A.

Now, a third (new) access occurs to cache line 7, as shown in the diagram 300B of FIG. 3B, and the box is grown to enclose the new point. As always with a new data point, the box grows along the x-axis. However, the upper edge of the box also grows (upward in this case) along the y-axis. This change in direction and reflection of pointers to the minimum and maximum access are reflected on the right hand side of the diagram 300B. It is the movement of the lower and upper edges of the box that is used to determine whether a pattern of accesses is trending upward, downward, or neither.

In addition to tracking the trends of the lower and upper edges of the bounding box to determine a direction trend, the individual accesses are tracked, since it is often the case that patterns of accesses skip one or more cache lines. Thus, in order to prevent wasting prefetches on cache lines that are likely to be skipped, once an upward or downward trend has been detected, a bounding box prefetcher (including the bounding box prefetch unit of the present disclosure) uses additional criteria to determine which cache lines to prefetch. Because of the tendency of accesses to be reordered, a bounding box prefetcher represents the history of accesses with the temporal ordering aspect stripped away. This is done by marking bits in an access bitmask, where each bit corresponds to one cache line within a memory block. For each access that arrives to a particular memory block, the corresponding bit in the access bitmask is set. Once a sufficient number of accesses have been made to the memory block, the prefetcher uses the access bitmask, which has no indication of the temporal ordering of the accesses, to make prefetching decisions (e.g., predictions) based on the large view of accesses to the entire block rather than making prefetching decisions based on a very small view of accesses and strictly according to their occurrence in time as with conventional prefetchers.

Figure 4:
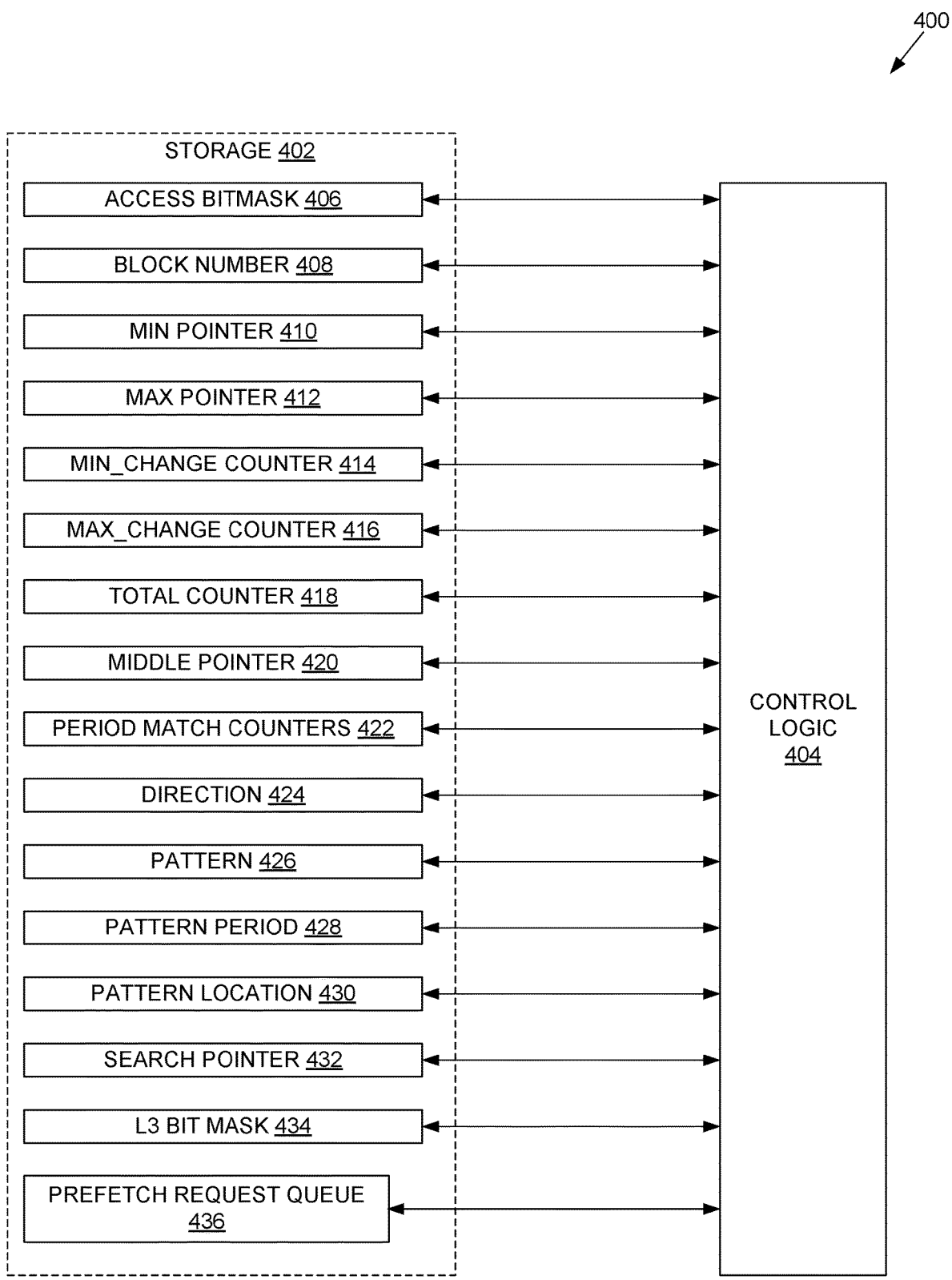
FIG. 4 is a block diagram that illustrates an embodiment of storage and control logic for a prefetcher page entry for an embodiment of a bounding box prefetch unit.

With this general description of bounding box prefetchers, attention is now directed to FIG. 4, which is a block diagram that illustrates storage and control logic for an embodiment of a bounding box prefetch unit. As indicated above, description of much of the hardware and control logic depicted in FIG. 4 is based at least in part on U.S. Pat. No. 8,880,807 (hereinafter, '807 patent), which is incorporated herein by reference in its entirety, where enhancements are further described to efficiently handle applications where dense access patterns make it not only difficult to establish pattern matching but also causes a decrease in bandwidth of the L2 fill queue. Referring to FIG. 4, shown is the bounding box prefetch unit 400 comprising storage (e.g., a plurality of registers) 402 and control logic 404 (e.g., which may be embodied as a control unit, including a finite state machine) for each prefetcher page entry (among plural prefetcher page entries maintained by the bounding box prefetch unit). In other words, the bounding box prefetch unit 400 maintains plural prefetcher page entries to enable a tracking of accesses (via state information, or simply, state) to, and, in general, pattern matching for, multiple memory blocks, with a combination of storage and control logic for each prefetcher page (e.g., 4 KB page) to implement prefetch generation. Note that the bounding box prefetch unit 232 (FIG. 2) may be implemented using the bounding box prefetch unit 400 shown and described in association with FIG. 4.

The storage 402 comprises an access bitmask register 406 (also referred to as a block bitmask register). Each bit in the access bitmask 406 corresponds to one cache line within a memory block whose block number is stored in a block number register 408. That is, the block number register 408 stores the upper address bits of the memory block. A true value of a bit in the access bitmask 406 indicates that the corresponding cache line has been accessed. The access bitmask 406 is initialized such that all bits are false. In one embodiment, the size of a memory block is 4 KB (which may in some instances equal the size of a physical memory page) and the size of a cache line is 64 bytes; thus, there are 64 bits in the access bitmask 406. However, the size of a cache line may vary in other embodiments. Furthermore, the size of the memory region over which the access bitmask 406 is maintained may vary and does not necessarily correspond to the size of a physical memory page. Rather, the size of the memory region, or block, over which the access bitmask 406 is maintained may be arbitrary (preferably a power of two), as long as it encompasses a sufficiently large number of cache lines to enable detection of a clear direction and pattern for beneficial prefetching purposes. In the description that follows, the memory block is described as corresponding to a page (prefetcher page or prefetcher page entry) for brevity and to facilitate an understanding of the invention.

The storage 402 also includes a minimum (min) pointer register 410 and a maximum (max) pointer register 412 that are maintained to point to the lowest and highest cache line index, respectively, within the memory block that has been accessed since the bounding box prefetch unit 400 began tracking accesses to this memory block. The storage 402 also includes a min_change counter 414 and a max_change counter 416 that count the number of changes to the min pointer 410 and the max pointer 412, respectively, since the bounding box prefetch unit 400 began tracking accesses to this memory block. The storage 402 also includes a total counter 418 that counts the total number of cache lines accessed since the bounding box prefetch unit 400 began tracking accesses to this memory block. In some embodiments, other mechanisms may be used to count the accesses, including using a population count of the access mask (e.g., a 64-bit pop count). The storage 402 also includes a middle pointer 420 that points to the middle cache line index (i.e., the average of the min pointer 410 and max pointer 412) within the memory block that has been accessed since the bounding box prefetch unit 400 began tracking accesses to this memory block. The storage 402 also includes a direction register 424, a pattern register 426, a pattern period register 428, a pattern location register 430, and a search pointer register 432, whose uses are described in more detail below.

The storage 402 also includes a plurality of period match counters 422. Each of the period match counters 422 maintains a count for a different period. In one embodiment, the periods are 3, 4, and 5, though other period values may be used in some embodiments. The period is the number of bits to the left/right of the middle pointer 420. The period match counters 422 are updated after each memory access to the block. If the access bitmask 406 indicates that the accesses to the left of the middle pointer 420 over the period match the accesses to the right of the middle pointer 420 over the period, then the bounding box prefetch unit 400 increments the period match counter 422 associated with that period. The operation and use of the period match counters 422 are described in more detail below.

Describing the aforementioned storage 402 in the context of prefetching, as explained above and illustrated in FIG. 2, the prefetch interface 230 is fed by incoming load requests from the L1D and the L1I. The L1 cache is sending load requests to the L2 cache 112 for accesses that missed in the L1 cache. For instance, upon the L1 cache receiving a load or store instruction, there is a search of the address in the L1D to which to load or store. More specifically, the L1D tag array 260 is searched to see if the cache line is present, whereby the request is satisfied directly, otherwise upon a cache miss, the request is forwarded to the L2 cache 112, which is bigger than the L1D and hence the request is more likely to hit there. However, the L2 cache 112 is also slower and further away from the execution units, resulting in a higher latency of access. If there is a miss in the L2 cache 112, then the request is forwarded to the L3 cache 130 (or forwarded to system memory if there is no L3 cache). The bounding box prefetch unit 232 (also 400) of the prefetch interface 230 monitors the stream of load requests (loads and stores) coming in from the L1D (and the L1I) and attempts to predict patterns. In general, the load requests that come in from the L1D (and the L1I) are received into a prefetch input queue and are removed in a subsequent clock cycle. There is a physical address associated with the removed load, and the physical address is truncated to be directed to the 4 KB address memory region (e.g., the 4 KB page corresponding to this request), and compared to determine a match (e.g., an address match) with any pages corresponding to a respective 4 KB region of memory that the bounding box prefetch unit is monitoring (e.g., to determine if there is bounding box prefetch unit storage and control logic allocated for this page). Note that each 4 KB page generally has one stream associated with it.

Assuming there is a match, the bounding box prefetch unit updates state information associated with the memory block, determine an offset into the memory region, and decodes it into a corresponding cache line (e.g., a 64-bit vector). The access bitmask 406 corresponds in one embodiment to the page entry of the memory region, where a bit is set for each cache line accessed during the monitoring of the memory region. If the bit was not already set, then this is a new access, in which case the total counter 418 (corresponding to the number of cache lines within the page that have been accessed) is incremented. Other state information that is updated include the block number 408 for the corresponding 4 KB page address region or memory region. The min pointer 410 or the max pointer 412 are updated for each access. That is, for each access, a determination is made as to whether this access is either below the current MIN or above the current MAX, and if so, the pointers are adjusted accordingly. Additionally, the counters min_change counter 414 and max_change counter 416 are incremented. The middle pointer 420 is adjusted, and the direction 424 (e.g., to determine whether the stream is going up or down) is adjusted based on the min_change counter 414 versus the max_change counter 416. For instance, a comparison is made between the number of times the min_change counter 414 versus the max_change counter 416 is changed.

Digressing briefly, since memory requests may occur out of order (e.g., reordered between a reservation station and memory order buffer, as is known), the state information facilitates determinations on the direction in the pattern of accesses. For instance, if the min_change counter 414 is updated twice and the max_change counter 416 is updated, say, ten times, there is a good chance the stream is trending upwards. Note that in some embodiments, other or additional mechanisms may be used to establish direction. For instance, a sub-sampling of page accesses (e.g., using first two accesses in the lower or upper quartile of a page, etc.) may be used to establish direction. The storage 402, including the period match counters 422, pattern 426, pattern period 428, pattern location 430, and search pointer 432, are used directly by the control logic 404 (also referred to as prediction logic) to determine a pattern in the accesses and then use those access patterns to make predictions of cache lines to prefetch.

The storage 402 further includes an L3 bitmask 434, which as explained below, is used to track L3 prefetches during instances of dense accesses where the fill queue has reached or exceeded a threshold capacity and L2 prefetches are prohibited. In short, the L3 bitmask 434 is accessed after the L3 prefetches for a memory block have been completed (e.g., when the end of the memory block has been reached) and prefetches are then re-issued according to a special attribute (e.g., bit setting as described above in association with FIG. 2) recognized in the L2 cache tag pipeline 250 to force the prefetches to allocate into the L2 cache according to the L3 bitmask 434.

The storage 402 also includes a prefetch request queue 436 (an output queue). The prefetch request queue 436 comprises a circular queue of entries, each of which stores prefetch requests generated by the operation of the bounding box prefetch unit 400. In one embodiment, the size of the prefetch request queue 436 is chosen to allow for full pipelining of requests into the L2 cache tag pipeline 250 (FIG. 2) such that the number of entries in the prefetch request queue 436 is at least as many as the number of stages in the L2 cache tag pipeline 250. The prefetch requests are maintained until the end of the L2 cache tag pipeline 250, at which point requests have one of three outcomes, namely: a hit in the L2 cache 112, a replay, or an allocation of a fill queue entry to prefetch the desired data from system memory. Note that the bounding box prefetch unit 400 also includes an input prefetch request queue (not shown) that receives requests from the L1D that are going into the L2 cache.

The bounding box prefetch unit 400 also includes control logic 404 that controls the elements of the bounding box prefetch unit 400 to perform the various functions described herein. The control logic 404, in effect, comprises prediction logic for prefetching based on the state information in storage 402.

Figure 5:
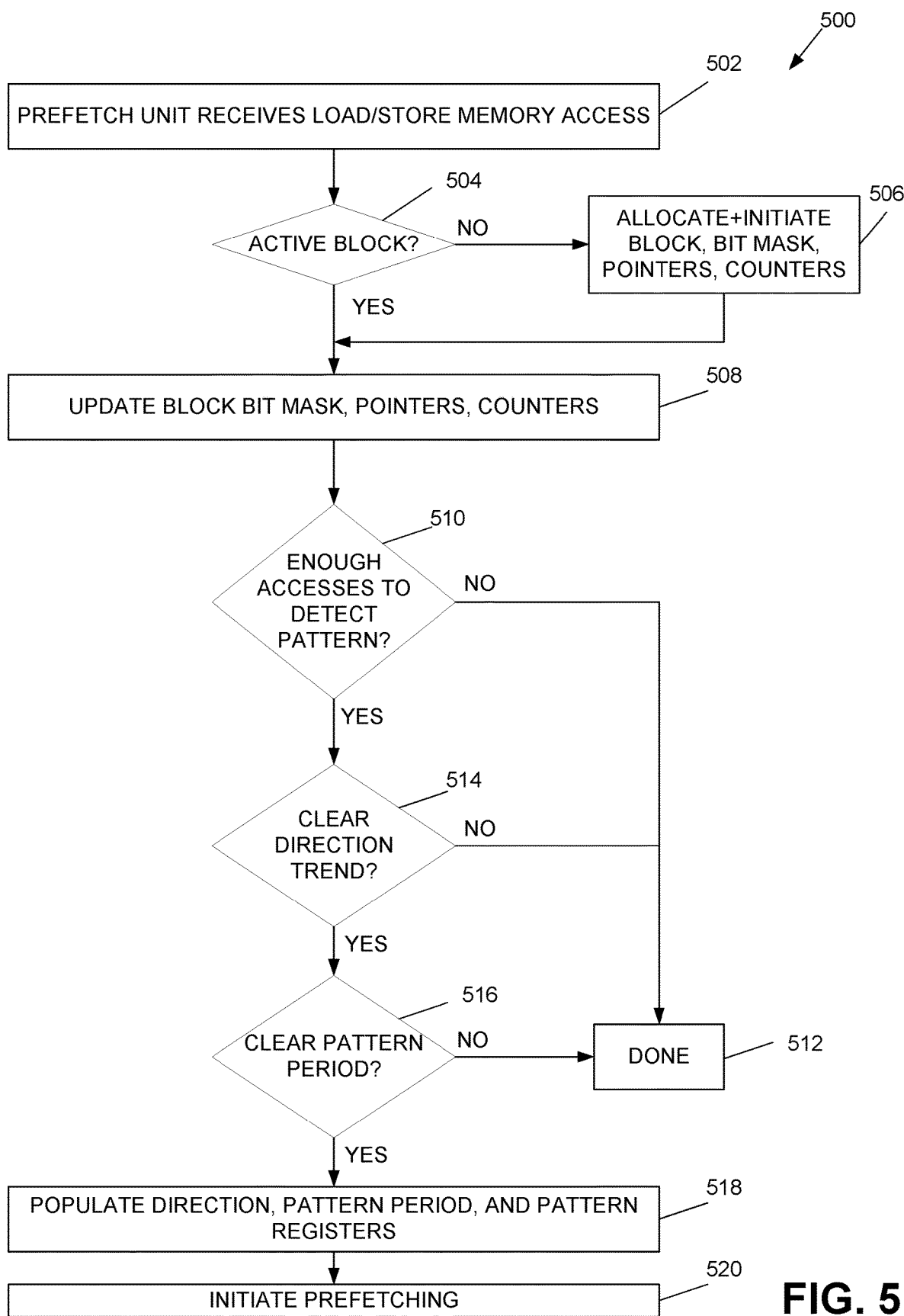
FIG. 5 is a flow diagram that illustrates a general method of operation of a bounding box prefetch unit.

FIG. 5 is a flow diagram that illustrates a general method of operation 500 of an embodiment of a bounding box prefetch unit, such as bounding box prefetch unit 400 (and 232). The general method 500 relates to the prediction of prefetches of cache lines based on pattern matching using the values maintained in the respective storage 402 for each active memory block. At block 502, the bounding box prefetch unit receives a load/store memory access to a memory address. In one embodiment, the bounding box prefetch unit distinguishes between loads and stores in determining which cache lines to prefetch; in another embodiment, the bounding box prefetch unit does not distinguish between loads and stores in determining which cache lines to prefetch. In one embodiment, the bounding box prefetch unit receives the memory access from a load/store unit in the microprocessor. The bounding box prefetch unit may receive the memory access from various sources including, but not limited to, the load/store unit, the L1 data cache 114 (e.g., an allocation request generated by the L1 data cache 114 as a result of a load/store unit memory access that misses in the L1 data cache 114), and/or other sources such as other prefetch units (not shown) of the microprocessor that employ different prefetch algorithms than the bounding box prefetch unit to prefetch data.

At decision block 504, the control logic 404 determines whether the memory access is to an active block by comparing the memory access address with each block number register 408 value. That is, the control logic 404 determines whether a prefetcher page entry (having a corresponding storage and control logic) has been allocated for the memory block implicated by the memory address specified by the memory access. If so, flow proceeds to block 508; otherwise, flow proceeds to block 506.

At block 506, the control logic 404 allocates a prefetcher page entry for the implicated memory block. For instance, the bounding box prefetch unit receives a memory access, and if there is no active entry for the corresponding page, a new prefetcher page entry (including initiating the corresponding storage and control logic) for the new page is instantiated. Note that the prefetcher page entries are fully independent of one another, since each prefetcher page entry corresponds to a unique 4 KB region of memory. For instance, the prefetcher page entry comprises state information for each access stream with an address within the 4 KB region. In one embodiment, allocation is achieved in a round-robin fashion. In another embodiment, least-recently-used information for the storage and control logic is maintained and allocation is performed on a least-recently-used basis. In particular, the control logic 404 initiates by clearing all the bits of the access bitmask 406, populating the block number register 408 with the upper bits of the memory access address, and clearing to zero the min pointer 410, max pointer 412, min_change counter 414, max_change counter 416, total counter 418, and period match counters 422. Flow proceeds to block 508.

At block 508, the control logic 404 updates the storage 402 based on the memory access address. For instance, the control logic 404 increments the total counter 418, and makes a determination whether the current memory access address is greater than the max pointer 412 or less than the min pointer 410. More specifically, for the max pointer 412 determination, the control logic 404 determines whether the current memory access address—i.e., the index within the memory block of the cache line implicated by the current memory access address—is greater than the max pointer 412 value. If so, the control logic 404 updates the max pointer 412 with the index within the memory block of the cache line implicated by the current memory access address and increments the max_change counter 416 and then proceeds to a middle pointer 420 determination. If not, the determination proceeds for the min pointer 410 comparison. That is, the control logic 404 determines whether the index within the memory block of the cache line implicated by the current memory access address is less than the min pointer 410 value. If so, the control logic 404 updates the min pointer 410 with the index within the memory block of the cache line implicated by the current memory access address and increments the min_change counter 414. Following the updates, the control logic 404 computes the average of the min pointer 410 and max pointer 412 and updates the middle pointer 420 with the computed average. The control logic 404 then examines the access bitmask 406 and isolates the N bits to the left and right of the middle pointer 420, where N is the number of bits associated with each of the respective period match counters 422. The control logic 404 then determines whether the N bits to the left of the middle pointer 420 match the N bits to the right of the middle pointer 420. If so, the control logic 404 increments the associated period match counter 422 having a period N, otherwise the update ends.

At decision block 510, the control logic 404 examines the total counter 418 to determine whether the program has made enough accesses to the memory block to detect a pattern of accesses. In one embodiment, the control logic 404 determines whether the total counter 418 value is greater than a predetermined amount, which in one embodiment is ten, although the predetermined amount may vary. If enough accesses have been made, flow proceeds to decision block 514; otherwise, flow ends 512.

At decision block 514, the control logic 404 determines whether there is a clear direction trend among the accesses specified in the access bitmask 406. That is, the control logic 404 determines whether the accesses are clearly trending upward (increasing access addresses) or downward (decreasing access addresses). In one embodiment, the control logic 404 determines whether there is a clear direction trend by determining whether the difference between the min_change counter 414 and the max_change counter 416 is greater than a predetermined amount, which in one embodiment is two, although the predetermined amount may vary. If the min_change counter 414 is greater than the max_change counter 416 by the predetermined amount, then the clear trend is downward; whereas, if the max_change counter 416 is greater than the min_change counter 414 by the predetermined amount, then the clear trend is upward. If there is a clear direction trend, flow proceeds to decision block 516; otherwise, flow ends 512.

At block 516, the control logic 404 determines whether there is a clear pattern period winner among the accesses specified in the access bitmask 406. In one embodiment, the control logic 404 determines whether there is a clear pattern period winner by determining whether the difference between one of the period match counters 422 and all the other period match counters 422 is greater than a predetermined amount, which in one embodiment is two, although the predetermined amount may vary. If there is a clear pattern period winner, flow proceeds to block 518; otherwise, flow ends 512.

At block 518, the control logic 404 populates the direction register 424 to indicate the clear direction trend determined at decision block 514. Additionally, the control logic 404 populates the pattern period register 428 with the clear winning pattern period (N) detected at decision block 516. Finally, the control logic 404 populates the pattern register 426 with the clearly winning pattern detected at decision block 516. That is, the control logic 404 populates the pattern register 426 with the N bits of the access bitmask 406 to the right or left of the middle pointer 420 (which will match, according to the description above for the updating in block 508). Flow proceeds to block 520.

At block 520, the control logic 404 initiates prefetching of non-fetched cache lines within the memory block. As an illustration of one method for the prefetching of non-fetched cache lines, the control logic 404 initializes the search pointer 432 and pattern location 430 at one pattern period 428 away from the middle pointer 420 in the detected direction. That is, the control logic 404 initializes the search pointer 432 and pattern location 430 to the sum/difference of the middle pointer 420 value and the period (N) value of the detected pattern. For example, if the middle pointer 420 value is 16 and N is five and the direction 424 is upward, then the control logic 404 initializes the search pointer 432 and pattern location 430 to 21. Thus, in this example, the five bits of the pattern 426 would be located against bits 21 through 25 of the access bitmask 406 for comparison purposes. The control logic 404 examines the bit in the access bitmask 406 at the search pointer 432 and the corresponding bit in the pattern 426 (which is located against the access bitmask 406 at the pattern location 430) to determine whether to prefetch the corresponding cache line within the memory block. The control logic 404 predicts whether the examined cache line is needed. The control logic 404 predicts the cache line is needed if the bit in the pattern 426 is true (i.e., the pattern predicts the program will access the cache line). If the cache line is needed, flow proceeds to determine whether the cache line is already fetched. Otherwise, the control logic 404 determines whether there are any more unexamined cache lines in the memory block by determining whether the search pointer 432 has reached an end of the access bitmask 406, and if there are no more cache lines, flow ends, otherwise, flow proceeds with the control logic 404 incrementing/decrementing the search pointer 432. Additionally, if the search pointer 432 has passed beyond the last bit of the pattern 426, the control logic 404 updates the pattern location 430 with the new value of the search pointer 432 (i.e., shifts the pattern 426 to the new search pointer 432 location), and then flow returns to examining the bit in the access bitmask 406 as described above.

Continuing, the control logic 404 determines whether the needed cache line has already been fetched. The control logic 404 determines that the needed cache line has already been fetched if the bit in the access bitmask 406 is true. If the needed cache line has already been fetched, flow proceeds to determining whether there are any more unexamined cache lines in the memory block as described above, otherwise the control logic 404 determines whether the cache line under consideration is more than a predetermined amount (which is sixteen in one embodiment) from the min pointer 410 if the direction 424 is downward or from the max pointer 412 if the direction 424 is upward. If so, flow ends; otherwise, flow proceeds to determining whether the request queue is full. It is noted that if the cache line is too far away from the min pointer 410/max pointer 412 such that flow ends, this does not mean that the bounding box prefetch unit will not subsequently prefetch additional cache lines within the block, since a subsequent access to a cache line within the block may trigger more prefetching within the block. Continuing, the control logic 404 determines whether the prefetch request queue 436 is full. If so, the control logic 404 stalls until the prefetch request queue 436 becomes non-full flow and then proceeds to allocate an entry as described below. Otherwise, the control logic 404 allocates an entry into the prefetch request queue 436 to prefetch the cache line.

Note that variations to the above methods of operation may be implemented, as described in part in the '807 patent, and hence are contemplated to be within the scope of the disclosure.

In one embodiment, one or more of the predetermined amounts described herein are programmable, either by the operating system (such as via a model specific register (MSR)) or via fuses of the microprocessor 100 that may be blown when the microprocessor 100 is manufactured.

Having described a general operation of the bounding box prefetch unit 400 (FIG. 4), attention is now directed to operations under particular conditions where pattern matching as described above is a challenge. That is, in the description that follows, the set of conditions under which the bounding box prefetch unit 400 issues prefetches as L3 prefetches and then brings in the cache lines of the L3 prefetches as L2 prefetches is explained. Digressing briefly, it had been observed that for certain benchmarks and applications, prefetching performance was poor, despite the fact that the access pattern was very dense (exhibiting a high spatial locality). For instance, many cache lines are being retrieved and all accesses are concentrated with the memory regions, which suggests good conditions for prefetching. However, in normal operation as explained above, search engine logic is looking at two contiguous regions of accesses around the midpoint (e.g., under the premise that accesses around the midpoint are going to be the least susceptible to front end reordering) and determining if there is a match (e.g., using a plurality of periods, including 2, 3, 4, etc.). It was determined that a period match of approximately thirteen (e.g., matching thirteen cache line patterns) should achieve a good prefetching performance in prefetching during aggressive prefetching (e.g., when conditions are ripe for the aggressive prefetching). However, the longer period match not only requires a significant hardware increase, but given the use of two contiguous regions for the match, results in a significant progression through the page (e.g., a third or half-way through the page) before establishing the period match (and hence the need for a new stream or page to train on). Further, longer pattern matching may be hampered by the inability to establish with any confidence lower pattern matches. Generally, confidence is typically established after a few successes in pattern matching, and if unable to successfully pattern match, then poor prefetching performance may result. Poor prefetching (e.g., in terms of low confidence or reliability) has its costs, including consumption of power and memory bandwidth. Further, since prefetching cache lines results in the eviction of others, there is the risk that cache lines of specious merit are brought in at the expense of cache lines needed to fulfill demand requests.

To determine these conditions, the bounding box prefetch unit 400 (e.g., control logic 404) assesses the state information indicated by the storage registers 402. If the access bitmask 406 is dense (e.g., from the min pointer 410 to the max pointer 412), where a threshold number of bits (e.g., at least three quarters of the bits from the min pointer 410 to the max pointer 412) are set, and at least a minimum number of accesses have been detected (e.g., 8-10 accesses), and no period has been established (e.g., period 2, period 5, etc.), then the bounding box prefetch unit 400 operates under a premise that assumes this condition where accesses are very dense and there is an inability or difficulty establishing a good period match. Accordingly, the bounding box prefetch unit 400 performs aggressive prefetching, where pattern matching is suspended and cache lines for the remaining rest of the page (e.g., memory block) are prefetched in some embodiments. In some embodiments, the aggressive prefetching is performed with a constraint on the number of cache lines to bring in. As an example of constraints, the prefetching may be achieved without exceeding more than 8 lines or 12 lines ahead of the latest access (e.g., depending on the direction). As an illustration, pattern matching is suspended, and the next, say, eight (8) subsequent cache lines are prefetched, while trying to stay 8 cache lines ahead of the latest access. So if there are accesses A, B, then a prefetch may consist of C, D, E, F, G, H, I, and J. If a next access is to C, then K is prefetched. If a next access is to E, then L and M are prefetched, and so forth. In some embodiments, pattern matching continues and is used to cancel this aggressive prefetching if a pattern is established (and sustainable). In some embodiments, the aggressive prefetching continues after establishing a pattern, but cache lines are only prefetched according to the new pattern.

Explaining further, initially, the bounding box prefetch unit 400 tracks the number of entries corresponding to accesses and which are exhibiting high confidence. That is, the bounding box prefetch unit 400 tracks these entries for each memory block while determining the confidence based on incoming load requests that are matching on to cache lines that had already been prefetched. If the incoming load requests match onto cache lines that had already been prefetched, confidence is increased, and for no matches (e.g., for cache lines not prefetched, or if cache lines are prefetched and yet not accessed), confidence is lowered. With the establishment of a number of high confidence pages under these conditions (e.g., 5 out of 8), then the bounding box prefetch unit 400 increases aggressive prefetching where the assumption is that of an application involving the streaming of memory with a low chance of prediction. Accordingly, when receiving a load request for a new page and the request is in the lowest or highest region of the page, aggressive prefetching is commenced immediately (e.g., without waiting for a minimum number of accesses or three-quarters of the bits of the access bitmask 406 set). In other words, the aggressive prefetching continues under the assumption that the performance metrics (e.g., high confidence, dense accesses) are maintained and hence the new entry appears to be a continuation of the same software stream or software pattern, thus justifying the aggressive prefetching until the confidence begins to trend downward (e.g., lower confidence).

During prefetching, as explained above, the bounding box prefetch unit 400 generates requests into the L2 tag pipeline 250 for the purpose of accessing the L2 tag array 260 to compare the address for which prefetching is desired to the L2 tag array 260. If there is a match (e.g., if the address is already there), there is effectively nothing more to do with this particular prefetch (e.g., operation is treated somewhat like a NOP). However, if the cache line is not in the L2 cache (no match in the L2 data array 260), then an L2 miss results, and the request is forwarded to the L3 cache 130) to bring the requested cache line in. L2 cache misses result in the allocation of an entry in the L2 fill queue 242 of the of the external interface 240. The L2 fill queue 242 limits the total number of outstanding L2 to L3 misses, and it does fill up. The L2 fill queue 242 is significant to performance. If the L2 fill queue 242 fills up with prefetches, demand accesses from the L1 cache (e.g., L1D) that miss in the L2 cache 112 may not be allowed to allocate into the L2 fill queue 242, which leads to a back-up of demand requests because of the relatively more speculative prefetches. If the L2 fill queue 242 is beyond a threshold capacity (e.g., half, three-quarters, etc.), all of the prefetches are forced to allocate into the L3 cache (e.g., effectively converted to L3 prefetches, where prefetches are brought in from system memory to the L3 cache 130) based on a special attribute or bit setting in the prefetch request (e.g., the ForcePrefetchL2 not set, as described above). One benefit of doing an L3 prefetch instead of an L2 prefetch is that the L2 fill queue 242 entry for an L3 prefetch need only be retained in the L2 fill queue 242 long enough to send the request to the L3 cache 130 and receive an acknowledgement that the request has been accepted (i.e., without waiting around for the actual data). In other words, instead of this request having to live for potentially, say 20-30 clocks (hitting in the L3), or hundreds of clocks if going to system memory, this L2 fill queue 242 entry for the L3 prefetch needs only to be retained in the L2 fill queue 242 for approximately 5-10 clocks depending on the latency to the L3 cache 130. Thus, prefetches can very quickly turn over L2 fill queue 242 entries (which reduces the impediment to fulfilling demand requests) and not present such a drain on the core total memory bandwidth. Another benefit is that there is no need to evict a cache line (from the L2 cache) to make room for the new line brought into the L3 cache.

The capacity issues are important when the bounding box prefetch unit 400 is performing aggressive prefetching, since the significant amount of prefetches can fill up the L2 fill queue 242 quickly. One mechanism to manage the L2 fill queue 242 during aggressive prefetching is to throttle the amount of prefetched cache lines. The choice of the amount to prefetch is anywhere from a single cache line ahead to all remaining cache lines until the end of the page. For instance, a single prefetch, though allowing for good stewardship of L2 fill queue resources, provides for poor hit rate performance. On the other hand, for the prefetching of all of the remaining cache lines of the memory block, though the cache hit rate may improve, given the fewer entries of the L2 fill queue 242 versus the amount of cache lines (e.g., 16 entries versus 50 cache lines), the L2 fill queue 242 will be full for multiple iterations of the stream of prefetches, resulting in consuming all of the chip's memory bandwidth until all of the other cache lines are brought in. As is known in the industry, in terms of clock cycles, it is better to hit in the L3 cache versus hitting in system memory (e.g., an improvement of hundreds of clocks). But, it is even better to hit in the L2 cache then it is to hit in the L3 cache (e.g., L2 hit latency from the L1D miss request to the L2 cache providing data is only approximately 5-6 clocks). As explained above, one tradeoff is if the prefetches are not allowed to run ahead very far, though then there are not enough prefetches generated to realize much of a benefit. On the other hand, if prefetches are allowed to advance further along in terms of the amount of cache lines, either memory bandwidth is dominated or some locality is sacrificed (e.g., only a small percentage of the prefetches go to the L2 cache).

Certain embodiments of a bounding box prefetch unit 400 addresses one or more of the above issues/challenges through the use of the L3 bitmask 434 and a special attribute (e.g., bit setting) in the prefetch request. The L3 bitmask 434 comprises an additional bitmask of the storage 402 that has bits that are set for each prefetch initially intended to be brought into the L2 cache 112 but constrained to be brought only into the L3 cache 130 as a result of the L2 fill queue 242 reaching a certain threshold capacity. In one embodiment, a bit is set in the L3 bitmask 434 for each cache line intended for the L2 cache 112 yet brought into L3 cache 130. If there is a demand access to a given cache line, the corresponding bit in the L3 bitmask 434 is cleared. Accordingly, a running tally of cache lines that were prefetched into the L3 cache 130 initially intended for the L2 cache 112, yet prohibited from being brought into the L2 cache 112 due to the L2 fill queue 242 being too full, is maintained. Upon the L3 prefetches reaching the end of the page or associated memory block (and with no novel prefetches to generate), through the use of the L3 bitmask 434, the prefetching process starts back at either the min pointer 410 or the max pointer 412 (depending on the direction 424), and for each and every cache line that was brought in to just the L3 cache 130 (as indicated by the bit setting of the L3 bitmask 434), a new prefetch (request) is issued sequentially, one cache line at a time, to generate a prefetch for the next cache line whose corresponding bit in the L3 bitmask 434 is set. In other words, a new prefetch issues for each of these cache lines (with bits set in the L3 bitmask 434) with a special attribute that says to bring this cache line into the L2 cache 112 (e.g., which ignores any L2 fill queue full heuristic that normally turns this prefetch into an L3 prefetch, instead bringing this cache line into the L2 cache 112). The special attribute is a bit setting in the newly issued prefetch requests as described above (e.g., if the ForcePrefetchL2 bit is set, the prefetch ignores the threshold calculation and continues as an L2 prefetch). As is known, when the various queues are requesting, and being arbitrated between them, to go into the L2 tag pipeline 250, they all provide a certain set of information (e.g., their ID, type of transaction, physical address is, which cache way is the destination (if known), traits, etc.). In other words, the bit setting is another attribute or bit in that same prefetch request structure. The added bit in the L2 tag pipeline 250 ignores the fill queue full heuristic that turns all prefetches into L3 prefetches.

In one embodiment, the prefetches brought into the L2 cache 112 (originally brought into the L3 cache 130) are brought in according to a leash or constraint. In one embodiment, the constraint may be determined based on a specified maximum distance in terms of physical address. For instance, the prefetch may be up to N cache lines away, where N may be 8, 16, or some other value where good performance is obtained. In some embodiments, the constraint may involve a prefetch distance in the sense of up to N additional prefetches, where the prefetches are spaced, say, cache lines apart. As an illustrative example using a spacing of three (3), eight (8) prefetches ahead corresponds to 8×3 or twenty-four (24) cache lines away. Note that in some embodiments, the choice of N may be implemented using software. In some embodiments, N may be modified based on confidence. For instance, for a very low confidence stream, generated prefetches may be more conservative (e.g., one or two cache lines ahead), whereas for a very high confidence stream, a more aggressive approach is implemented (e.g., six cache lines ahead).

If new load requests come in and allocate a new prefetcher page entry in the bounding box prefetcher pages (new memory block), such requests are typically going to be for one or two accesses to either the lowest quarter or the upper quarter of the page if it is just a continuation of the same software pattern, the same software stream. The bounding box prefetch unit 400 immediately (e.g., with zero additional accesses) or almost immediately (e.g., after 1 or 2 accesses) generates a flurry of prefetches, all or the majority of which are converted into L3 prefetches. And as similarly described above for the L3 prefetches of one of the memory blocks, once the prefetch of the very last line of the page has occurred (end of the memory block), there are new issues of prefetches with a special attribute and beginning at either the min pointer 410 or max pointer 412 (e.g., depending on direction 424) with, in some embodiments, a given constraint or leash on the amount of prefetches to bring cache lines, brought into the L3 cache 130, into the L2 cache 112 according to the set bits of the L3 bitmask 434 of the corresponding memory block.

It is important to generate the L3 prefetches as quickly as possible because the L3 cache 130 has much more resources available to bring cache lines in from system memory than the L2 cache. For instance, the L2 cache may only have the capability to manage sixteen (16) outstanding requests if they are all coming back to the L2 cache 112, which, if system memory latency is hundreds of cycles, clearly is not going to be close to pipeline processing. In one embodiment, there are eight L3 caches (for serving all of the 8 cores) and each has, depending on the design, 16 or 32 outstanding requests resources, so one core can basically span an entire page worth of L3 prefetches distributed across all eight L3 caches. In other words, each of those L3 caches can begin under system memory accesses and none of those queues are going to fill up. And then once the prefetching starts over at the beginning with the L2 prefetches it is more likely to just be bringing cache lines in from the L3 cache. By issuing all prefetches as L3 prefetches when the L2 fill queue reaches a certain percentage of full capacity (e.g., ¾ full), the memory bandwidth problem is mitigated.

Figure 6:
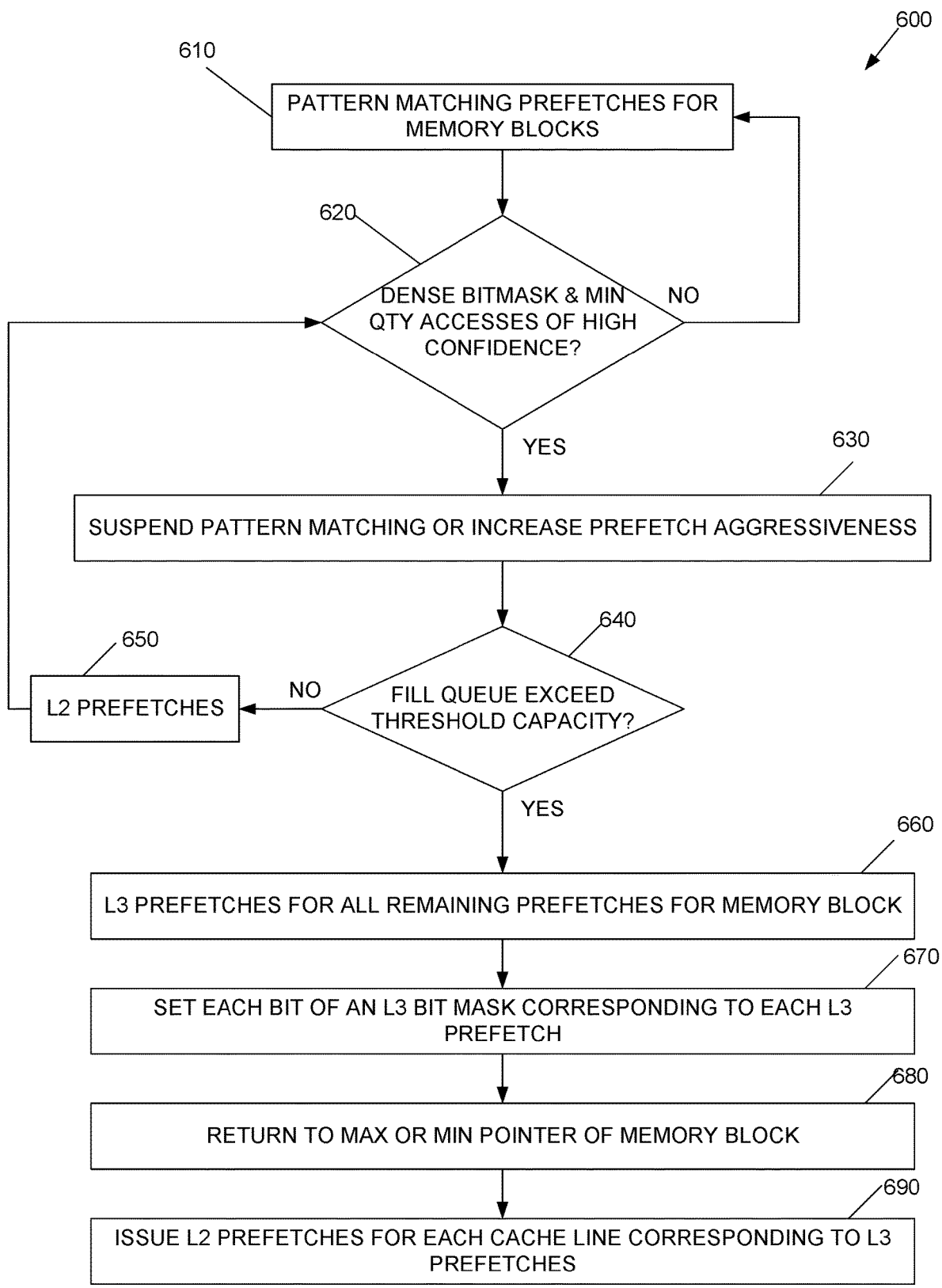
FIG. 6 is a flow diagram that illustrates an embodiment of an example method used during aggressive prefetching for an embodiment of a bounding box prefetch unit.

In view of the above description, it should be appreciated by one having ordinary skill in the art that one embodiment of an example method of operation of an embodiment of a microprocessor that includes a bounding box prefetch unit 400, as denoted in FIG. 6 as method 600, comprises initially pattern matching prefetches for memory blocks 610. For instance, pattern matching is described above in conjunction with FIG. 5. The method 600 further comprises determining a first set of conditions, including whether the access bitmask 406 is dense and whether there has been a minimum quantity of accesses 620. If not, pattern matching continues 610; otherwise, the method 600 comprises suspending pattern matching and increasing the aggressiveness of prefetching 630. For instance, the bounding box prefetch unit 400 performs L2 prefetches. In one embodiment, the L2 prefetches may be constrained by a leash or constraint of N cache lines ahead, where N may equal one or a plurality of cache lines ahead as described above. The method 600 assesses another condition, namely, whether the L2 fill queue has at least exceeded a threshold capacity 640. If not, the method 600 continues the L2 prefetches 650 and assesses the confidence of prefetches 620. For instance, if the confidence falls, then aggressive prefetches become less productive, and aggressiveness may be throttled or suspended in favor of prefetching via pattern matching. If the L2 fill queue has at least exceeded a threshold capacity 640, the method 600 performs all remaining prefetches for the memory block as L3 prefetches (e.g., based on a special attribute in the request, as described above). In some embodiments, the L3 prefetches are performed with a constraint on the amount of cache lines prefetched ahead that may be as performed for the L2 prefetches or as modified to suit performance 660 and each bit of an L3 bitmask 434 corresponding to each L3 prefetch is set 670. Upon reaching the end of the memory block, the method 600 comprises returning to either the min pointer or the max pointer depending on the trend or direction of accesses 680 and issuing L2 prefetches based on a special attribute for each cache line brought in as L3 prefetches 690. For instance, the cache lines to be brought in as L2 prefetches correspond to the set bits of the L3 bitmask 434.

Figure 7:
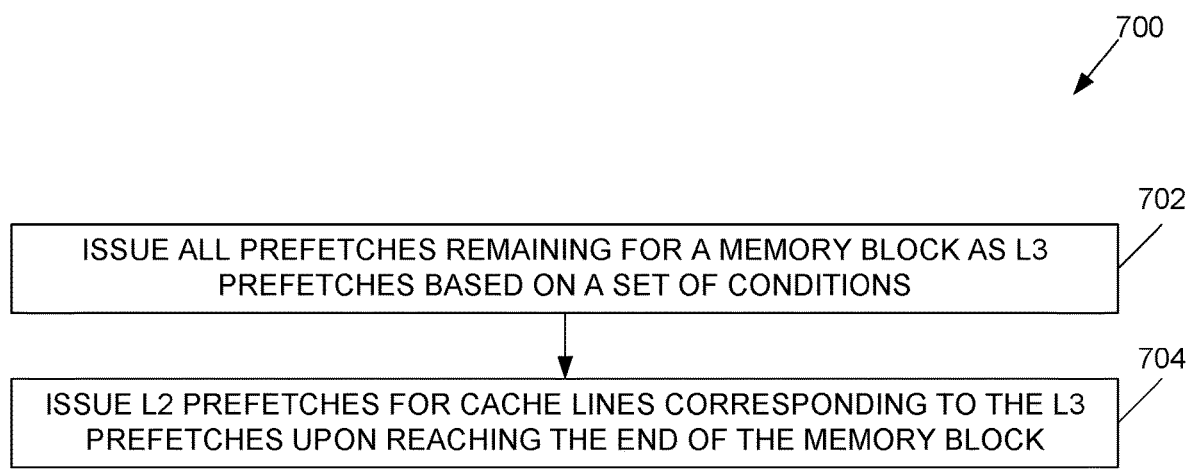
FIG. 7 is a flow diagram that illustrates an embodiment of an example bounding box prefetching method.

Further, in view of the above description, it should be appreciated by one having ordinary skill in the art that one embodiment of an example, bounding box prefetching method, as denoted in FIG. 7 as method 700, comprises: issuing all prefetches remaining for a memory block as L3 prefetches based on a set of conditions 702; and issuing L2 prefetches for cache lines corresponding to the L3 prefetches upon reaching the end of the memory block 704. For instance, each bit of an L3 bitmask that corresponds to each of the L3 prefetches may be set, and the L2 prefetches are issued for cache lines corresponding to the bits set in the L3 bitmask. Special attributes in the request (e.g., bit settings) enable the L2 and L3 prefetches.

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, or one or more of the blocks may be omitted, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
an L1 cache;
an L2 cache comprising a bounding box prefetch unit and an L2 fill queue, the bounding box prefetch unit configured to allocate an entry in the L2 fill queue based on a miss in the L2 cache; and
an L3 cache;
wherein, based on the allocation, the bounding box prefetch unit is configured to:
issue all prefetches remaining for a memory block as L3 prefetches based on a set of conditions; and
issue L2 prefetches for plural cache lines corresponding to the L3 prefetches upon the plural cache lines obtained from the L3 prefetches reaching an end of the memory block.

2. The microprocessor of claim 1, wherein the bounding box prefetch unit maintains plural prefetcher page entries, each of the plural prefetcher page entries corresponding to storage and control logic, wherein the storage comprises plural registers.

3. The microprocessor of claim 2, wherein the plural registers further comprise a max pointer, a min pointer, and a direction, wherein the bounding box prefetch unit is configured to issue the L2 prefetches beginning at one of the plural cache lines corresponding to either the max pointer or the min pointer based on the direction.

4. The microprocessor of claim 2, wherein the plural registers further include an access bitmask and an L3 bitmask associated with the memory block comprising the plural cache lines, wherein the bounding box prefetch unit is further configured to set each bit of the L3 bitmask that corresponds to each of the L3 prefetches.

5. The microprocessor of claim 4, wherein the set of conditions includes first conditions comprising a threshold quantity of set bits in the access bitmask and a minimum quantity of accesses, and a second condition comprising a threshold capacity that has been exceeded in the L2 fill queue.

6. The microprocessor of claim 5, wherein based on the first conditions, the bounding box prefetch unit suspends pattern matching.

7. The microprocessor of claim 6, wherein the bounding box prefetch unit suspends pattern matching for a subsequent, second memory block based on a first access to the second memory block in a lowest or highest region of the second memory block.

8. The microprocessor of claim 5, wherein the L3 bitmask comprises prefetches intended for the L2 cache but prefetched to the L3 cache based on the threshold capacity that has been exceeded in the L2 fill queue.

9. The microprocessor of claim 5, wherein the plural registers further comprise a max pointer and a min pointer, wherein the threshold quantity of set bits in the access bitmask is determined between the min pointer and the max pointer for the memory block.

10. The microprocessor of claim 1, wherein the L2 fill queue comprises entries allocated based on L2 pipeline prefetch accesses that miss in an L2 tag array and L2 pipeline demand request accesses that miss in the L2 tag array.

11. The microprocessor of claim 1, wherein the L2 cache comprises bit entries that enable the L2 and L3 prefetches.

12. The microprocessor of claim 1, wherein under the set of conditions, the bounding box prefetch unit continues to monitor for a pattern match.

13. A prefetching method implemented in a microprocessor, the prefetching method comprising:
   allocating an entry in an L2 fill queue based on a miss in an L2 cache;
   based on the allocation:
   issuing all prefetches remaining for a memory block as L3 prefetches based on a set of conditions; and
   issuing L2 prefetches for cache lines corresponding to the L3 prefetches upon the plural cache lines obtained from the L3 prefetches reaching the end of the memory block.

14. The prefetching method of claim 13, wherein issuing the L2 prefetches begins at one of the cache lines corresponding to either a max pointer or a min pointer based on a direction of accesses.

15. The prefetching method of claim 13, wherein issuing all the remaining prefetches comprises converting L2 prefetches to L3 prefetches.

16. The prefetching method of claim 13, wherein the set of conditions includes first conditions comprising a threshold quantity of set bits in an access bitmask and a minimum quantity of accesses, and a second condition comprising a threshold capacity that has been exceeded in an L2 fill queue.

17. The prefetching method of claim 16, further comprising suspending pattern matching based on the first conditions.

18. The prefetching method of claim 17, further comprising suspending pattern matching for a subsequent, second memory block based on a first access to the second memory block in a lowest or highest region of the second memory block.

19. The prefetching method of claim 13, further comprising monitoring for a pattern match under the set of conditions.

20. The prefetching method of claim 13, further comprising enabling the L2 and L3 prefetches based on bit settings in the L2 cache.

* * * * *